US012074379B2

(12) United States Patent
Lee

(10) Patent No.: US 12,074,379 B2
(45) Date of Patent: Aug. 27, 2024

(54) PEDESTAL INCLUDING TILTED AZIMUTH AXIS

(71) Applicant: INTELLIAN TECHNOLOGIES INC., Pyeongtaek-si (KR)

(72) Inventor: Hyun Uk Lee, Goyang-si (KR)

(73) Assignee: INTELLIAN TECHNOLOGIES INC., Pyeongtaek-si (KR)

( * ) Notice: Subject to any disclaimer, the term of this patent is extended or adjusted under 35 U.S.C. 154(b) by 217 days.

(21) Appl. No.: 17/421,315

(22) PCT Filed: Jan. 8, 2020

(86) PCT No.: PCT/KR2020/000301

§ 371 (c)(1),
(2) Date: Jul. 7, 2021

(87) PCT Pub. No.: WO2020/149560

PCT Pub. Date: Jul. 23, 2020

(65) Prior Publication Data

US 2021/0399416 A1 Dec. 23, 2021

(30) Foreign Application Priority Data

Jan. 18, 2019 (KR) ........................ 10-2019-0006819

(51) Int. Cl.
*H01Q 3/08* (2006.01)
*H01Q 1/12* (2006.01)

(52) U.S. Cl.
CPC ............... *H01Q 3/08* (2013.01); *H01Q 1/125* (2013.01)

(58) Field of Classification Search
CPC ................................. H01Q 3/08; H01Q 1/125
USPC .......................................................... 343/765
See application file for complete search history.

(56) References Cited

U.S. PATENT DOCUMENTS 3,945,015 A * 3/1976 Gueguen ................ H01Q 1/125 343/912
3,999,184 A * 12/1976 Fuss, III .................. H01Q 3/08 343/765
5,075,682 A * 12/1991 Dehnert ............... H01Q 1/1257 343/915

(Continued)

FOREIGN PATENT DOCUMENTS

JP 63283205 A 11/1988
JP 6-66573 B2 8/1994

(Continued)

OTHER PUBLICATIONS

International Search Report of corresponding PCT/KR2020/000301, Apr. 14, 2020, 4 pages.

*Primary Examiner* — Hoang V Nguyen
*Assistant Examiner* — Brandon Sean Woods
(74) *Attorney, Agent, or Firm* — LEWIS ROCA ROTHGERBER CHRISTIE LLP

(57) ABSTRACT

A pedestal includes a supporter having an azimuth axis and a pivot on the azimuth axis, and a tracker connected to the pivot and configured to track an object within a field of view, wherein the azimuth axis is tilted with respect to a reference plane on which the supporter is installed in a direction away from a zenith line joining the pivot with a zenith within the field of view, and a tilt angle between the azimuth axis and the reference plane is set to correspond to an orbital angle of the object.

12 Claims, 14 Drawing Sheets

(56) References Cited

U.S. PATENT DOCUMENTS

| | | | | | |
|---|---|---|---|---|---|
| 6,151,496 | A * | 11/2000 | Richards | H04B 7/18541 455/442 |
| 6,198,452 | B1 * | 3/2001 | Beheler | H01Q 3/08 343/765 |
| 6,243,046 | B1 * | 6/2001 | Aoki | H01Q 19/12 343/765 |
| 6,285,338 | B1 * | 9/2001 | Bai | H01Q 19/13 343/882 |
| 6,433,736 | B1 * | 8/2002 | Timothy | H01Q 1/18 342/359 |
| 8,120,541 | B2 * | 2/2012 | Jung | H01Q 1/1257 343/765 |
| 2009/0231224 | A1 * | 9/2009 | Felstead | H01Q 3/08 343/882 |
| 2014/0299734 | A1 | 10/2014 | Nielsen | |

FOREIGN PATENT DOCUMENTS

| | | | |
|---|---|---|---|
| JP | H0666573 | B2 * | 8/1994 |
| JP | 2001-313506 | A | 11/2001 |
| JP | 2006-308510 | A | 11/2006 |
| KR | 10-0857536 | B1 | 9/2008 |
| KR | 2009081628 | A * | 7/2009 |
| KR | 10-2012-0105114 | A | 9/2012 |
| KR | 10-1477199 | B1 | 12/2014 |
| KR | 10-1734217 | B1 | 5/2017 |
| KR | 10-1757681 | B1 | 7/2017 |
| KR | 10-2020-0092245 | A | 8/2020 |
| NO | 151949 | B * | 3/1985 |

* cited by examiner

PEDESTAL INCLUDING TILTED AZIMUTH AXIS

CROSS-REFERENCE TO RELATED APPLICATION(S)

This application is a U.S. National Phase Patent Application of PCT/KR2020/000301, filed Jan. 8, 2020, which claims priority to Korean patent application 10-2019-0006819, filed on Jan. 18, 2019, the entire content of each of which is hereby incorporated by reference.

TECHNICAL FIELD

The following example embodiments relate to a pedestal with a tilted azimuth axis.

BACKGROUND ART

Devices for transmitting and receiving radio waves through antennas are known in the relevant area. A typical device is configured to have an azimuth axis (AZ axis) that substantially coincides with a zenith line joining the device provided on a reference plane with a zenith. While an antenna of this device tracks an object (e.g., satellite) that transmits and receives radio waves on a field of view FOV, the antenna needs to rotate relatively rapidly when an orientation axis thereof is in a region close to the zenith, rather than when in the other regions within the field of view. Accordingly, a relatively large capacity of power source is required to control the rotation velocity of the antenna while the orientation axis of the antenna is in a region close to the zenith. This phenomenon occurs when the azimuth axis coincides with the zenith line and is generally called the keyhole effect. In consideration of the foregoing, various types of devices are being developed to use a relatively small capacity of power source. For example, a pedestal for tracking an antenna is disclosed in US Patent Application Publication No. 2014/0299734. The pedestal disclosed in the publication is configured to be capable of three-axis driving for stabilizing the pointing of a mobile antenna. Such a three-axis driving pedestal requires a complex structure to implement high degrees of freedom.

DISCLOSURE OF INVENTION

Technical Goals

An aspect provides a pedestal configured to use a relatively small capacity of power source through a simple structure while stably tracking a target that transmits and receives radio waves and to use a small capacity of power source at the same time removing a section showing a sharp rise of a drive velocity in a region within a field of view through a structure for avoiding the keyhole effect.

Technical Solutions

According to an aspect, there is provided a pedestal including a supporter having an azimuth axis and a pivot on the azimuth axis, and a tracker connected to the pivot and configured to track an object within a field of view, wherein the azimuth axis is tilted with respect to a reference plane on which the supporter is installed in a direction away from a zenith line joining the pivot with a zenith within the field of view, and a tilt angle between the azimuth axis and the reference plane is set to correspond to an orbital angle of the object.

The tracker has an orientation axis, where the tilt angle may be set such that a singularity point at which the orientation axis of the tracker coincides with the azimuth axis is present in a vicinity of the field of view or outside the field of view.

The supporter may have a fixed rotation with respect to the reference plane.

The tracker may be configured to rotate independently with respect to each of the azimuth axis and the pivot.

The supporter may include a first supporter installed on the reference plane and having an inclined surface that is inclined with respect to the reference plane, and a second supporter installed on the inclined surface and having the azimuth axis and the pivot.

The pedestal may further include a cable connecting the first supporter and the tracker, where space may be provided between the first supporter and the tracker to sufficiently receive the cable so as to prevent interference between the cable and the tracker and a twist of the cable while the tracker rotates with respect to the pivot.

The cable may be placed on a same side of the tracker and the first supporter.

The cable may be prevented from wrapping while the tracker rotates with respect to the pivot.

The cable may have a slack configuration while the tracker rotates with respect to the pivot in a first direction, and have a taut configuration while the tracker rotates with respect to the pivot in a second direction which is opposite to the first direction.

Effects

According to example embodiments, a pedestal may have an azimuth axis that is tilted to the outside of a determined field of view and thus, prevent the keyhole effect while being driven within the field of view.

According to example embodiments, a pedestal may be configured to require no rapid adjustment of a rotation velocity of an antenna while an orientation axis thereof passes through a region close to a zenith.

According to example embodiments, a pedestal may require relatively low power to rotate an antenna and thus, reduce a capacity of a power source that is used.

According to example embodiments, a pedestal may be configured in a relatively simple structure to lower the overall weight.

The effects of the pedestal are not limited to the above-mentioned effects, and other unmentioned effects can be clearly understood from the above description by those having ordinary skill in the technical field to which the present disclosure pertains.

BEST MODE FOR CARRYING OUT THE INVENTION

Figure 1:
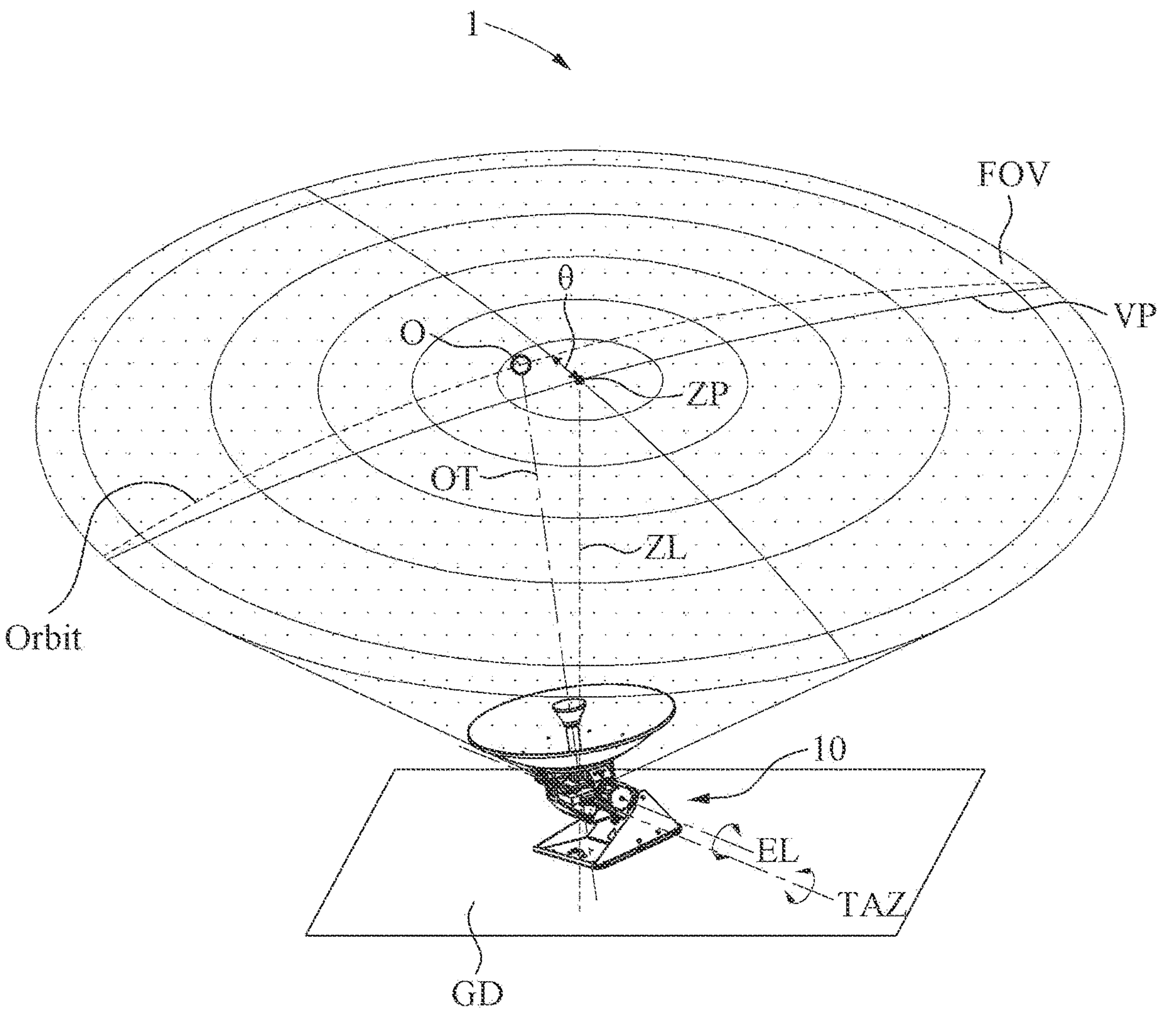
FIG. 1 schematically illustrates an example of the use of a pedestal according to an example embodiment.

Hereinafter, example embodiments will be described in detail with reference to the illustrative drawings. Regarding the reference numerals assigned to the components in the drawings, it should be noted that the same components will be designated by the same reference numerals, wherever possible, even though they are shown in different drawings. Further, in the following description of the present example embodiments, a detailed description of publicly known configurations or functions incorporated herein will be omitted when it is determined that the detailed description obscures the subject matters of the present example embodiments.

In addition, the terms first, second, A, B, (a), and (b) may be used to describe constituent elements of the example embodiments. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The constituent element, which has the same common function as the constituent element included in any one example embodiment, will be described by using the same name in other example embodiments. Unless disclosed to the contrary, the configuration disclosed in any one example embodiment may be applied to other example embodiments, and the specific description of the repeated configuration will be omitted.

FIG. 1 schematically illustrates an example of the use of a pedestal according to an example embodiment.

Referring to FIG. 1, a pedestal 10 according to an example embodiment operates to have an orientation axis OT track an object O on a system 1 where the pedestal 10 is used. Here, the object O may include, for example, an artificial satellite that transmits and receives radio waves.

The pedestal 10 has an elevational axis EL, which is a main axis, and a tilted azimuth axis TAZ, where the orientation axis OT of the pedestal 10 is configured to rotate independently with respect to the elevational axis EL and the tilted azimuth axis TAZ.

A field of view FOV refers to a working range in which the orientation axis OT of the pedestal 10 may track the object O. The field of view FOV is determined based on a range of rotation of the orientation axis OT with respect to the elevational axis EL and the tilted azimuth axis TAZ. For example, the field of view FOV may generally have a conical shape about the position of the pedestal 10.

A zenith ZP refers to a point at which an extension line perpendicular to a reference plane GD on which the pedestal 10 is installed meets the field of view. Here, the extension line perpendicular to the reference plane GD is defined as a zenith line ZL.

The object O moves along a set orbit on the field of view FOV. Here, an orbital plane including the orbit of the object O and a reference point on the reference plane GD on which the pedestal 10 is positioned is defined. An orbital angle is defined as an angle $\theta$ formed by the orbital plane and a vertical plane VP that passes through the zenith ZP and is perpendicular to the reference plane GD. A tilt angle of the tilted azimuth axis TAZ with respect to the reference plane GD is set to correspond to the orbital angle so as to stably track the object O within the field of view FOV.

Figure 2:
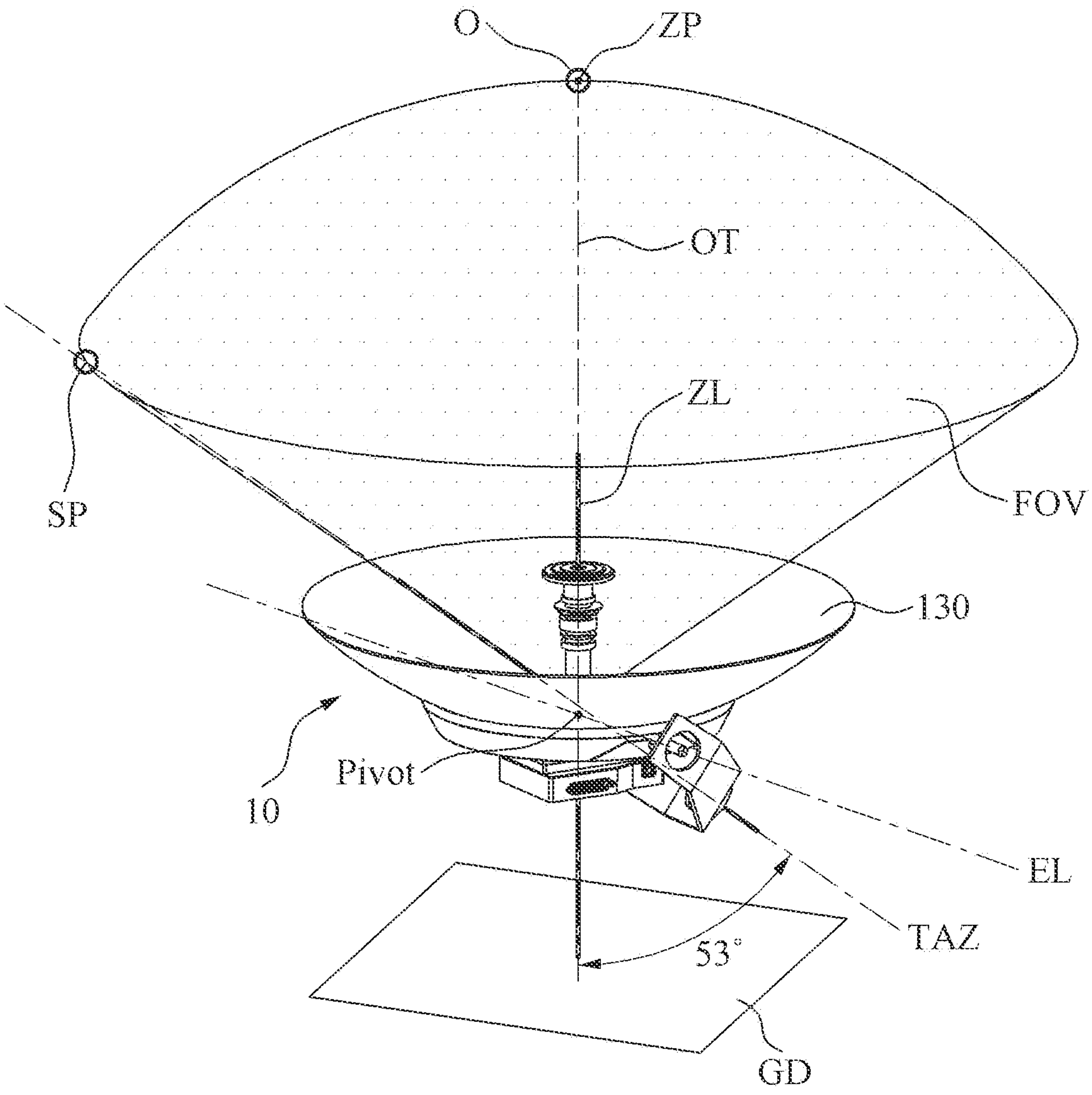
FIG. 2 is a conceptual diagram to describe a singularity point of a pedestal according to an example embodiment.

FIG. 2 is a conceptual diagram to describe a singularity point of a pedestal according to an example embodiment.

Referring to FIG. 2, the pedestal 10 according to an example embodiment may include a tracker 130 having an orientation axis OT that tracks an object. The tracker 130 may rotate with respect to the elevational axis EL about the pivot, and rotate with respect to the tilted azimuth axis TAZ independently from the rotation with respect to the elevational axis.

The singularity point SP is defined as a point on a celestial body on which the orientation axis OT of the tracker 130 coincides with the tilted azimuth axis TAZ. While an object O passes through a region in the vicinity of the singularity point SP, a radical change in the rotation direction and/or the rotation velocity of the tracker 130 that tracks the object O, the so-called keyhole effect, may occur. In this case, a power source needs to have a large capacity to drive the tracker 130 having the rotation direction and/or the rotation velocity that changes rapidly, and a large structural rigidness of the pedestal 10 may be required accordingly to support the large-capacity power source. Thus, the singularity point SP may not be present at the center of the field of view where an object O is mainly tracked, but in the vicinity of the field of view or preferably outside the field of view.

FIGS. 3A to 3E are conceptual diagrams to describe a relationship between a size of a field of view and a tilt angle and a positional change of a singularity point with respect to a change in the tilt angle, the tilt angle of an azimuth axis of a pedestal with respect to a reference plane on which the pedestal is installed, according to an example embodiment.

Figure 3A:
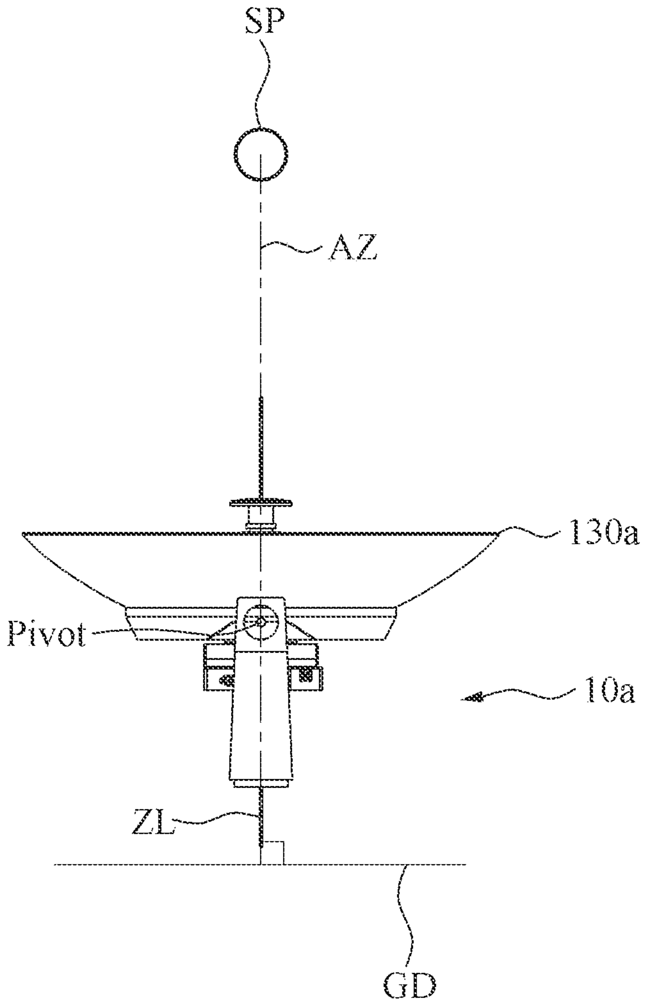
FIGS. 3A to 3E are conceptual diagrams to describe a relationship between a size of a field of view and a tilt angle and a positional change of a singularity point with respect to a change in the tilt angle, the tilt angle of an azimuth axis of a pedestal with respect to a reference plane on which the pedestal is installed, according to an example embodiment.
Figure 3B:
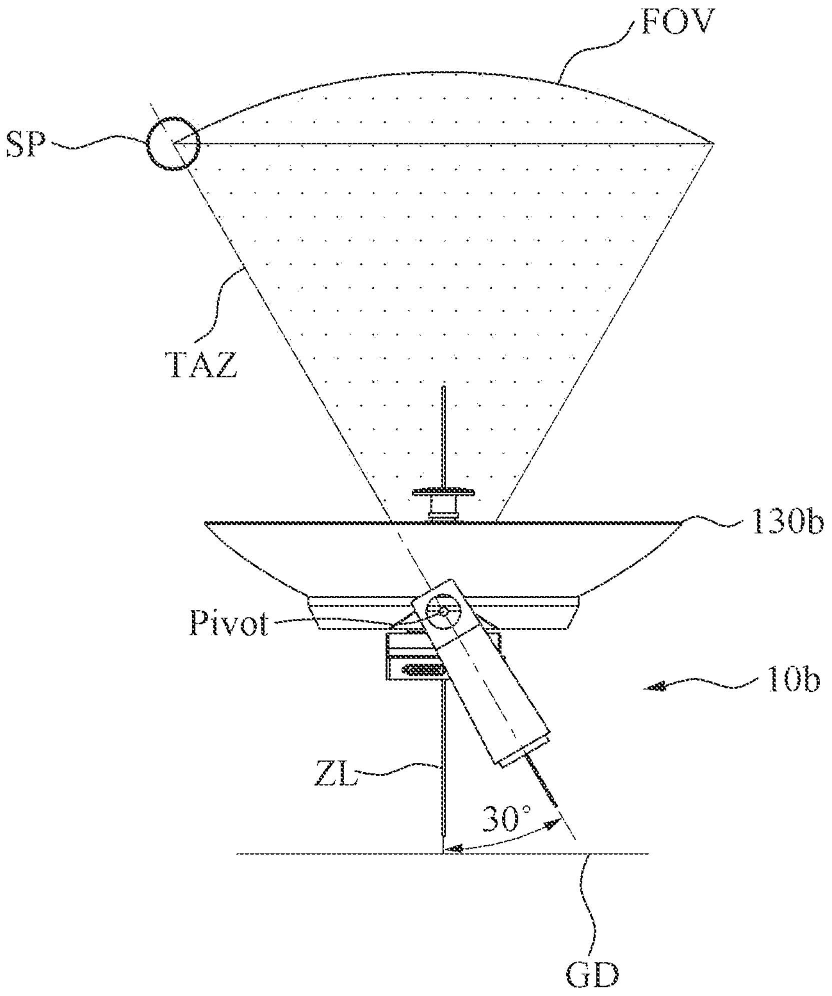
Figure 3C:
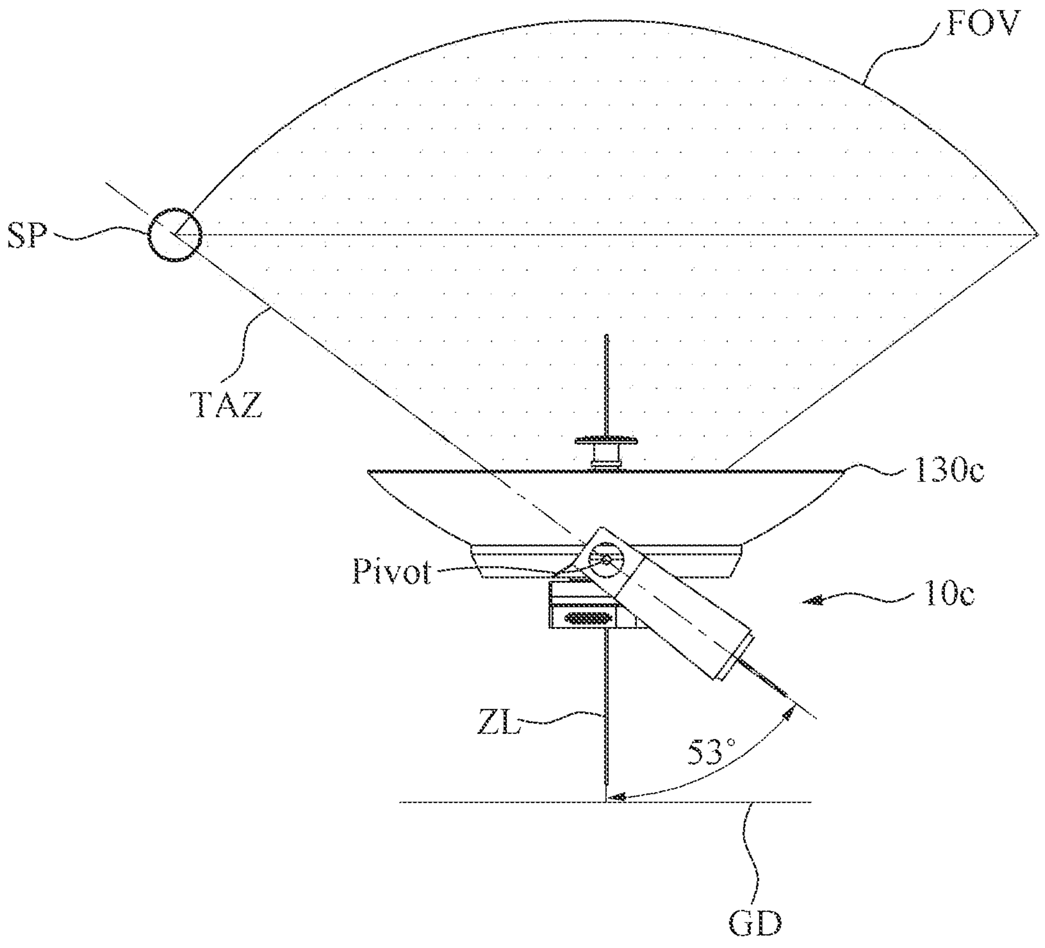
Figure 3D:
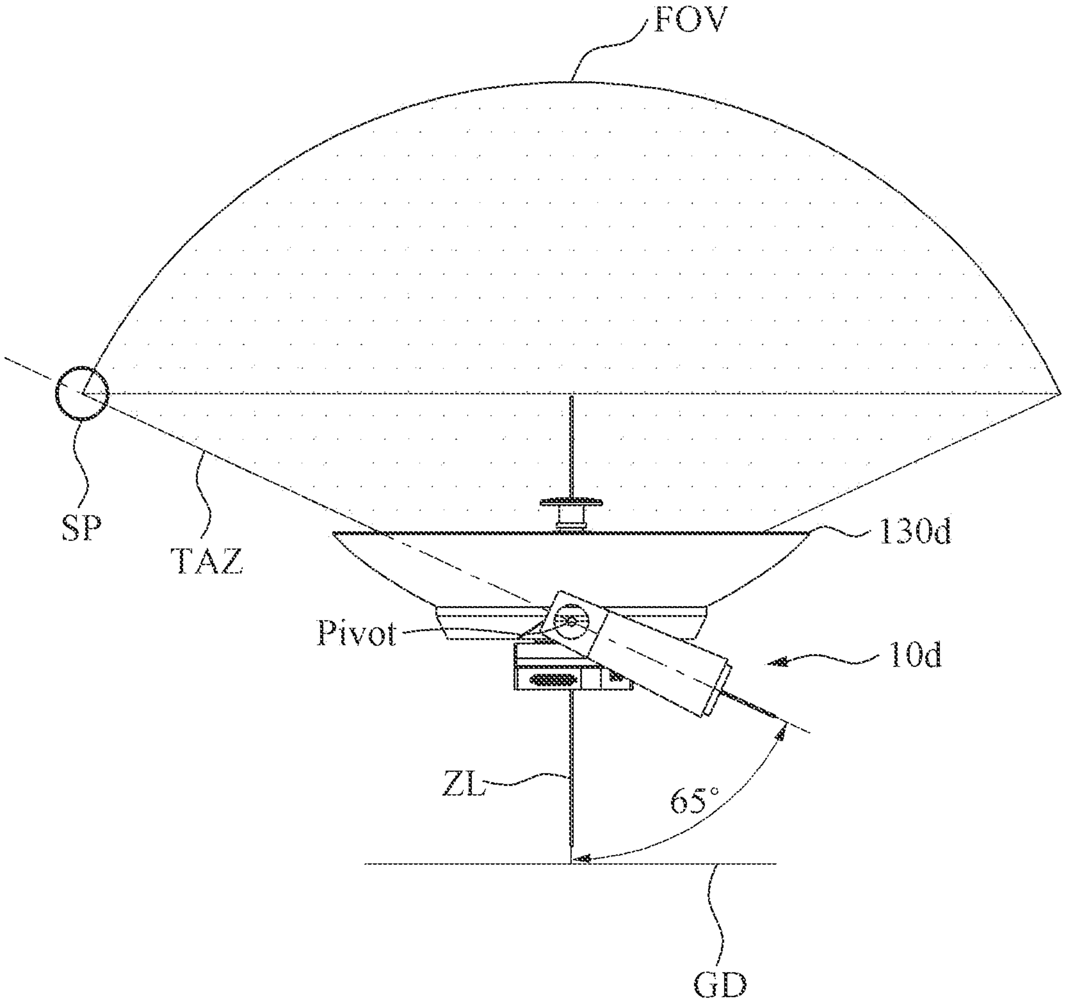
Figure 3E:
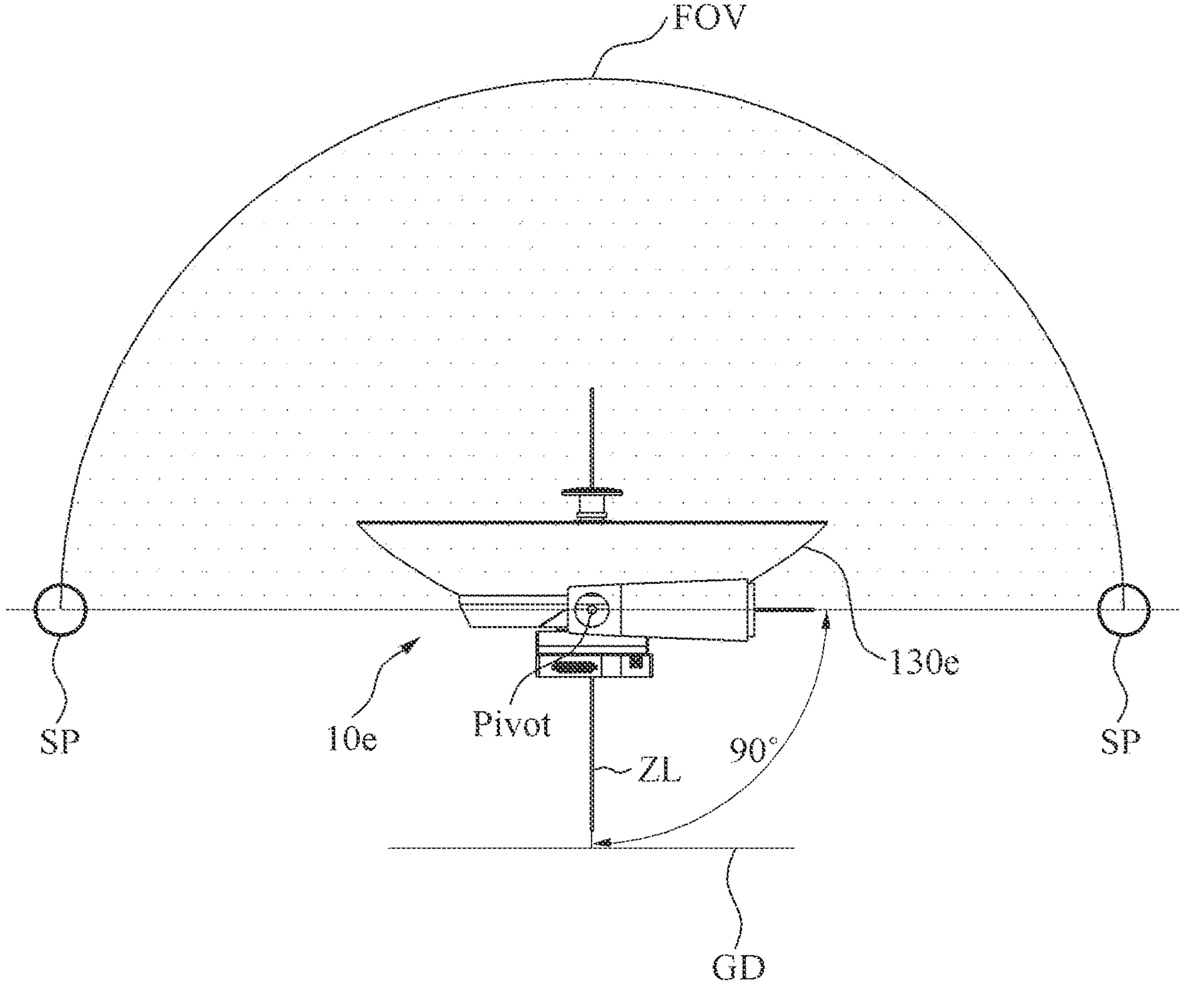

Referring to FIG. 3A, a conventional pedestal 10*a* may have an azimuth axis AZ that is perpendicular to a reference plane GD and coincides with a zenith line ZL. In this example embodiment, a singularity point SP may be positioned on the zenith line ZL. When an object being tracked by the tracker 130 passes through the singularity point SP, the rotation direction and/or the rotation velocity of the tracker 130 may change radically in the vicinity of the singularity point SP based on the azimuth axis AZ.

Referring to FIGS. 3B to 3E, pedestals 10*b*, 10*c*, 10*d*, and 10*e* according to example embodiments may have azimuth axes AZs that are tilted with respect to the reference plane GD about 30 degrees, about 53 degrees, about 65 degrees, and about 90 degrees, respectively. Sequentially from the example embodiment of FIG. 3B to the example embodiment of FIG. 3E, the singularity point SP positioned on the tilted azimuth axis TAZ is further away from the zenith line ZL, and the size of the field of view FOV further increases.

The pedestals 10*b*, 10*c*, 10*d*, and 10*e* having the tilted azimuth axes TAZs of which the tilt angles with respect to the reference plane GD are greater than 0 degrees may be less likely to experience the keyhole effect within the field of view FOV than the pedestal 10*a* having the azimuth axis AZ that coincides with the zenith line ZL, operate using a relatively small capacity of a power source in terms of driving efficiency, and require a reduced structural rigidness to support the power source.

Figure 4:
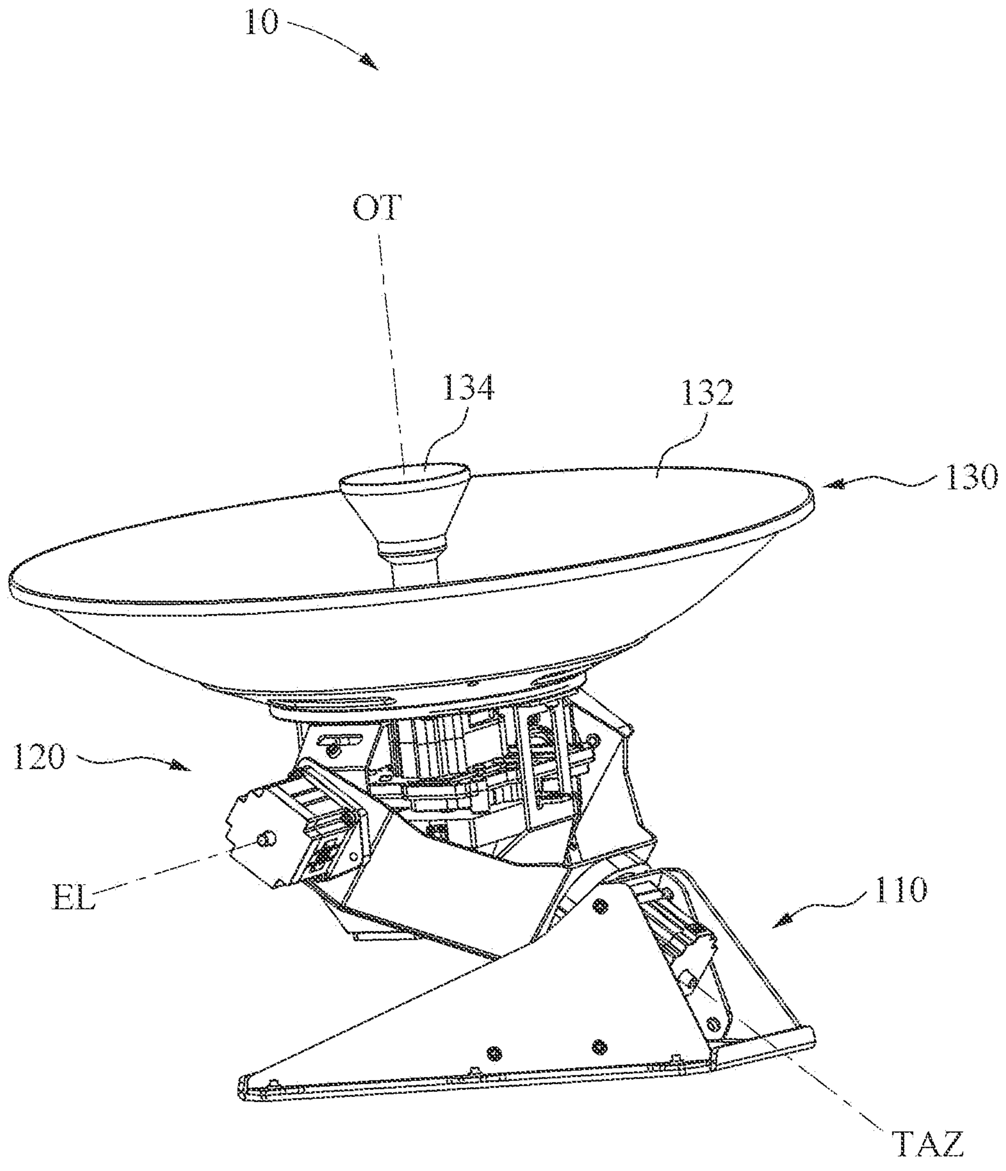
FIG. 4 is a perspective view schematically illustrating a structure of a pedestal according to an example embodiment.
Figure 5:
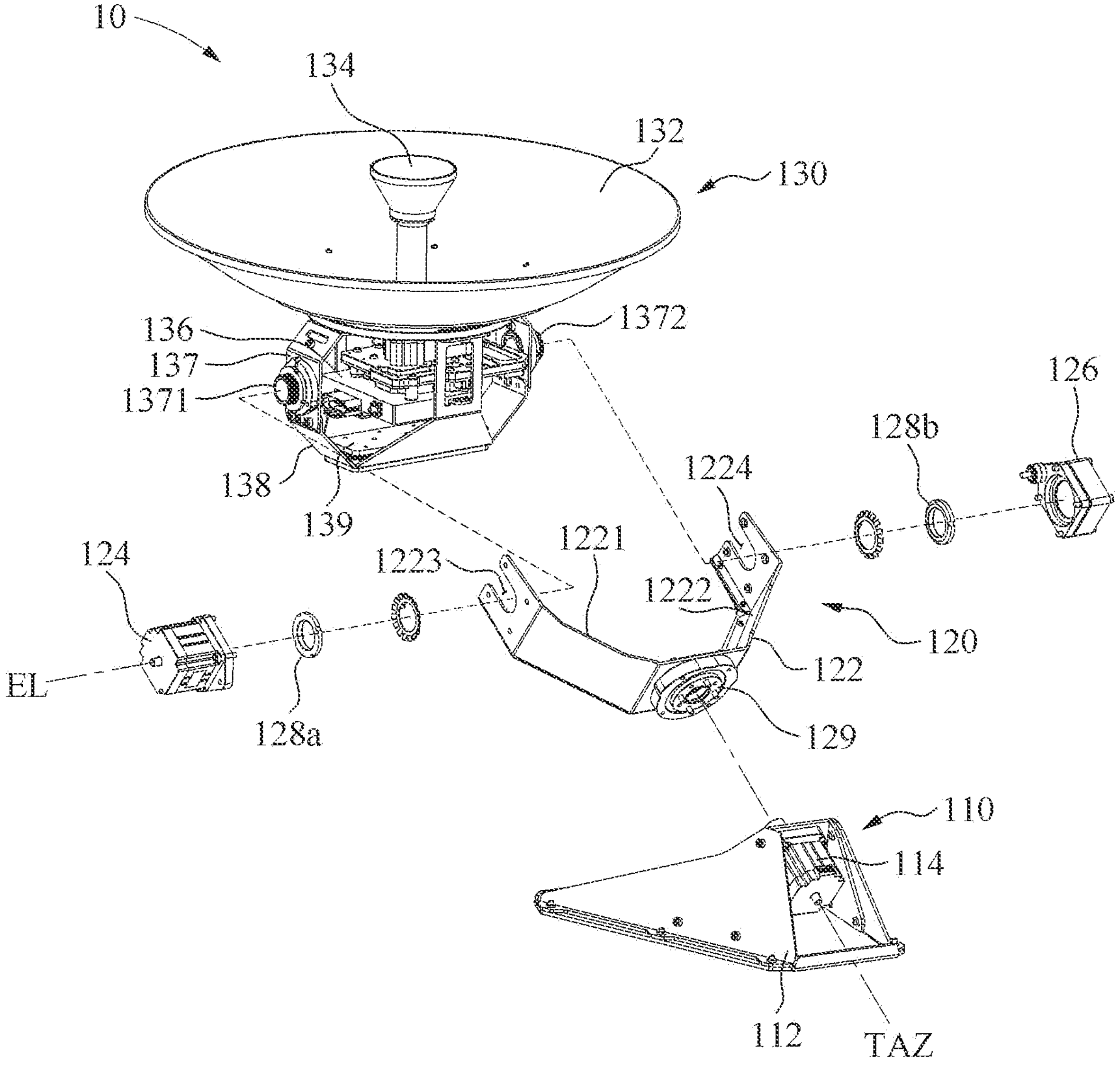
FIG. 5 is an exploded perspective view schematically illustrating the structure of the pedestal of FIG. 4.

FIG. 4 is a perspective view schematically illustrating a structure of a pedestal according to an example embodiment, and FIG. 5 is an exploded perspective view schematically illustrating the structure of the pedestal of FIG. 4.

Referring to FIGS. 4 and 5, the pedestal 10 according to an example embodiment may include a first supporter 110, a second supporter 120, and the tracker 130. In this example embodiment, the second supporter 120 is configured to have a tilted azimuth axis TAZ of about 53 degrees with respect to a reference plane on which the first supporter 110 is installed.

The first supporter 110 is installed on the reference plane and configured to support the second supporter 120 and the tracker 130. The first supporter 110 may include a first frame 112 having an inclined surface on which the second supporter 120 is installed and a first driver 114 positioned opposite to the second supporter 120 based on the inclined surface of the first frame 112 and coupled to a bearing assembly 129 of the second supporter 120. A drive shaft of the first driver 114 coincides with the tilted azimuth axis TAZ of the pedestal 10. The second supporter 120 is configured to rotate with respect to the tilted azimuth axis TAZ in response to the drive of the first driver 114.

The second supporter 120 is installed on the first supporter 110 and configured to support the tracker 130. The second supporter 120 is configured to rotate with respect to the drive shaft of the first driver 114, that is, the tilted azimuth axis TAZ of the pedestal 10. The second supporter 120 may include a second frame 122, a second driver 124, a first balancer 126, nuts 128*a* and 128*b*, and the bearing assembly 129.

The second frame 122 may include a first arm 1221 and a second arm 1222. The first arm 1221 may extend in a first direction to enclose the tracker 130, and the second arm 1222 may extend in a second direction to enclose the tracker 130. The first arm 1221 and the second arm 1222 may be positioned opposite to each other based on the tracker 130. A proximal portion of the first arm 1221 and a proximal portion of the second arm 1222 may be coupled to each other. The bearing assembly 129 may be installed provided in the proximal portion of the first arm 1221 and the proximal portion of the second arm 1222 that are coupled to each other. A first slot 1223 may be formed in the extension direction of the first arm 1221 at an end portion of the first arm 1221, and a second slot 1224 may be formed in the extension direction of the second arm 1222 at an end portion of the second arm 1222.

The second driver 124 may be coupled to the second frame 122 and the tracker 130 so that a drive shaft thereof coincides with the elevational axis EL. In a detailed example embodiment, the drive shaft of the second driver 124 may pass through the first nut 128*a*, be inserted into the first slot 1223 at the end portion of the first arm 1221 such that the first nut 128*a* is positioned between the second driver 124 and the first arm 1221, and be coupled to a first shaft 1371 provided in a third frame 137 of the tracker 130.

The first balancer 126 may be positioned opposite to the second driver 124 based on the second frame 122 in consideration of the weight of the second driver 124. In a detailed example embodiment, the first balancer 126 may be coupled to the end portion of the second arm 1222 such that the second nut 128*b* is positioned between the first balancer 126 and the second arm 1222.

Alternatively, the second driver 124 may be inserted into the second slot 1224 provided at the end portion of the second arm 1222 and coupled to a second shaft 1372 provided in the third frame 137 of the tracker 130, where the second shaft 1372 is positioned opposite to the first shaft 1371 based on the third frame. In this example embodiment, the first balancer 126 may be coupled to the end portion of the first arm 1221.

The bearing assembly 129 may be installed in the proximal portion of the first arm 1221 and the proximal portion of the second arm 1222 and coupled to the drive shaft of the first driver 114. In the example embodiment shown, an inner race of the bearing assembly 129 is fixed, while an outer race thereof is configured to rotate. In an alternative example embodiment not shown, the inner race of the bearing assembly 129 rotates, while the outer race thereof is fixed.

The tracker 130 is configured to track an object (e.g., satellite) on the field of view. The tracker 130 may include a reflecting body 132, a feed horn 134 positioned at the center of the reflecting body 132, a transmitting/receiving device 136 communicating radio wave information with the feed horn 134, the third frame 137 installed on a rear surface of the reflecting body 132, a fourth frame 138 coupled to the third frame 137 and configured to enclose the transmitting/receiving device 136 along with the third frame 137, and a second balancer 139 positioned opposite to the reflecting body 132 based on the transmitting/receiving device 136. The weight of the second balancer 139 may be set in consideration of the weight of the transmitting/receiving device 136 and the weight of the fourth frame 138.

The third frame 137 and the fourth frame 138 may each include arms extending in both directions, where end portions of the arms of the third frame 137 may be coupled to corresponding end portions of the arms of the fourth frame 138, respectively. The first shaft 1371 and the second shaft 1372 to which the second driver 124 is to be coupled may be installed respectively in the end portion of the arm of the third frame 137 and the end portion of the arm of the fourth frame 138 that are coupled to each other. The reflecting body 132 of the tracker 130 may be configured to rotate with respect to the elevational axis EL in response to the operation of the second driver 124 coupled to the first shaft 1371 or the second shaft 1372.

In one example embodiment, the first supporter 110 may have a fixed position with respect to the reference plane. In this example embodiment, the pedestal 10 does not rotate against an axis perpendicular to the reference plane. The pedestal 10 according to this example embodiment follows a dual-axis drive method where the tracker 130 rotates independently with respect to two axes, the devotional axis EL and the tilted azimuth axis TAZ.

Figure 6:
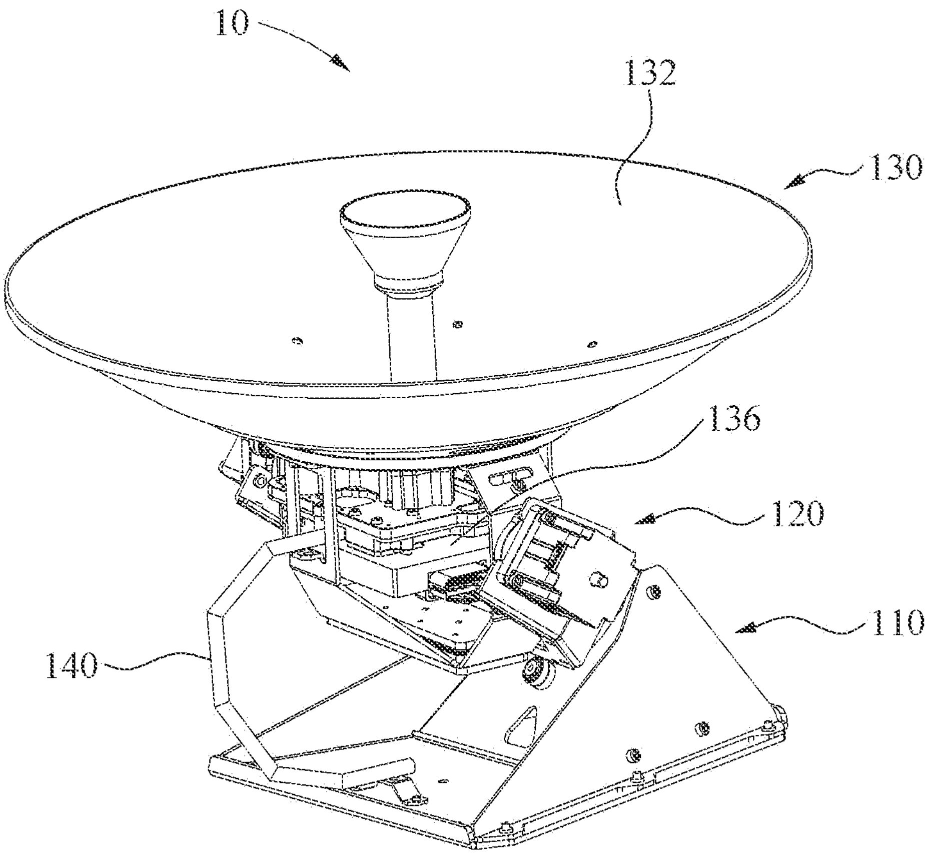
FIG. 6 is a side view schematically illustrating a configuration of a cable connecting a supporter and a tracker in a pedestal according to an example embodiment.
Figure 7:
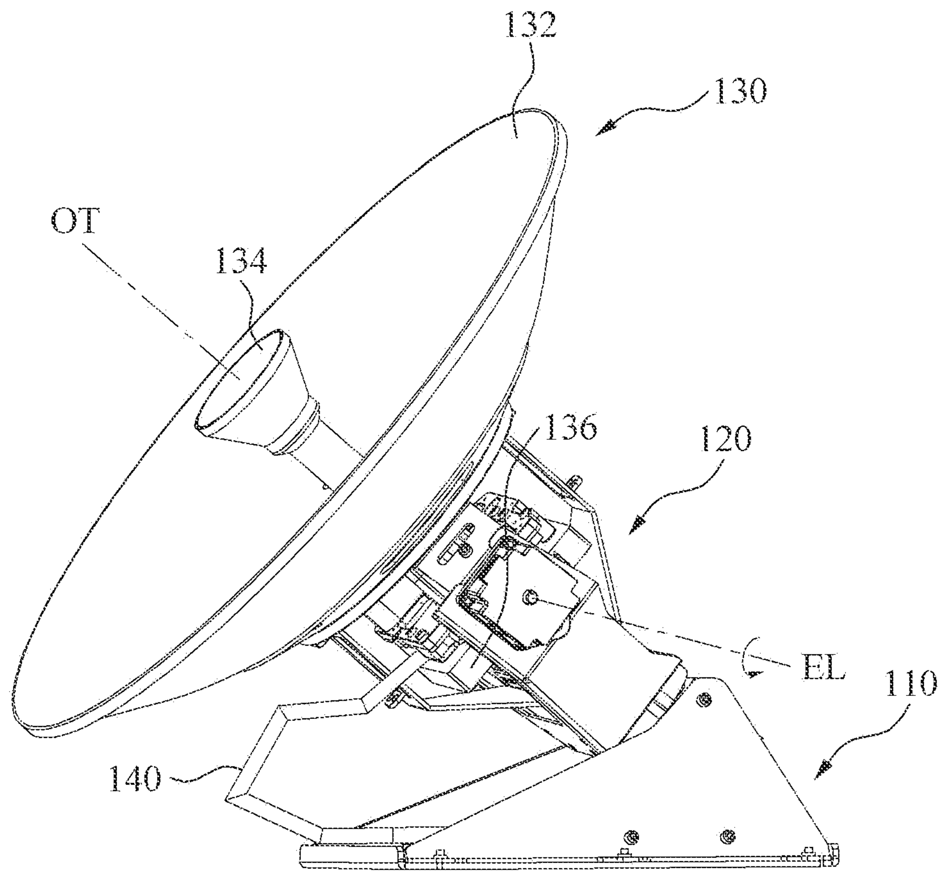
FIG. 7 is a side view schematically illustrating a configuration of a cable when a tracker in a pedestal rotates in a direction toward a reference plane according to an example embodiment.
Figure 8:
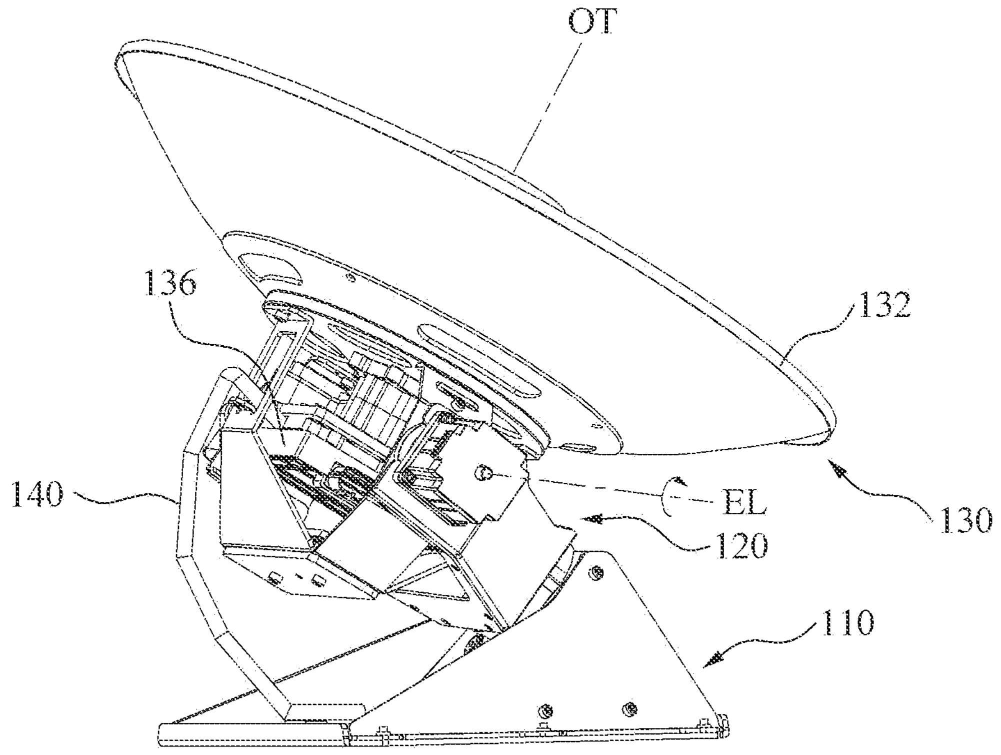
FIG. 8 is a side view schematically illustrating a configuration of a cable when a tracker in a pedestal rotates in a direction away from a reference plane according to an example embodiment.

FIG. 6 is a side view schematically illustrating a configuration of a cable connecting a supporter and a tracker in a pedestal according to an example embodiment, FIG. 7 is a side view schematically illustrating a configuration of the cable when the tracker in the pedestal rotates in a direction toward a reference plane according to an example embodiment, and FIG. 8 is a side view schematically illustrating a configuration of the cable when the tracker in the pedestal rotates in a direction away from the reference plane according to an example embodiment.

Referring to FIG. 6, the pedestal 10 according to an example embodiment may further include a cable 140 connecting the first supporter 110 and the tracker 130. Ends of the cable 140 may be clamped to the first supporter 110 and the tracker 130. In this example embodiment, the cable 140 may be positioned in a slack configuration in space between the first supporter 110 and the tracker 130 so as to prevent a twist of the cable 140 itself and interference resulting from the operation of the tracker 130. In a preferable example embodiment, the cable 140 may be placed on the same side (for example, on the left side when viewed based on FIG. 6) of the first supporter 110 and the tracker 130.

In an example, the cable 140 may include a cable. In an example, the cable 140 may have any suitable length to maintain the slack configuration. In an example, the cable 140 may include any suitable elastic material.

Referring to FIG. 7, when the tracker 130 rotates downward about the elevational axis EL, the cable 140 may maintain a substantially slack configuration not to be twisted. Referring to FIG. 8, when the tracker 130 rotates upward about the elevational axis EL, the cable 140 may maintain a substantially taut configuration not to be twisted.

As described above, such configurations of the cable 140 have structurally simple advantages in helping to prevent a twist of the cable 140 itself and interference resulting from the operation of the tracker 130 and requiring no separate mechanism for wrapping of the cable 140.

Figure 9:
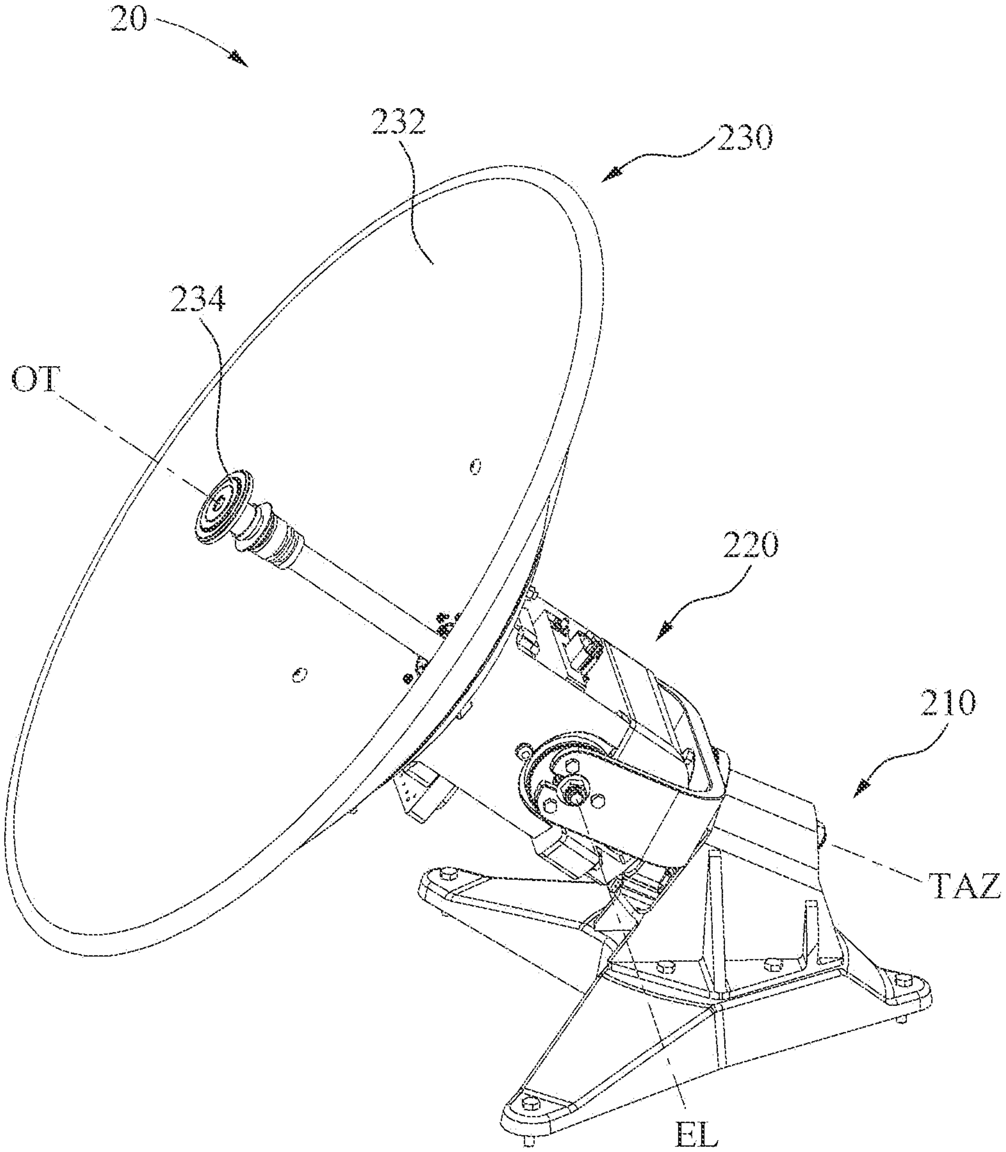
FIG. 9 is a perspective view schematically illustrating a structure of a pedestal according to an example embodiment.
Figure 10:
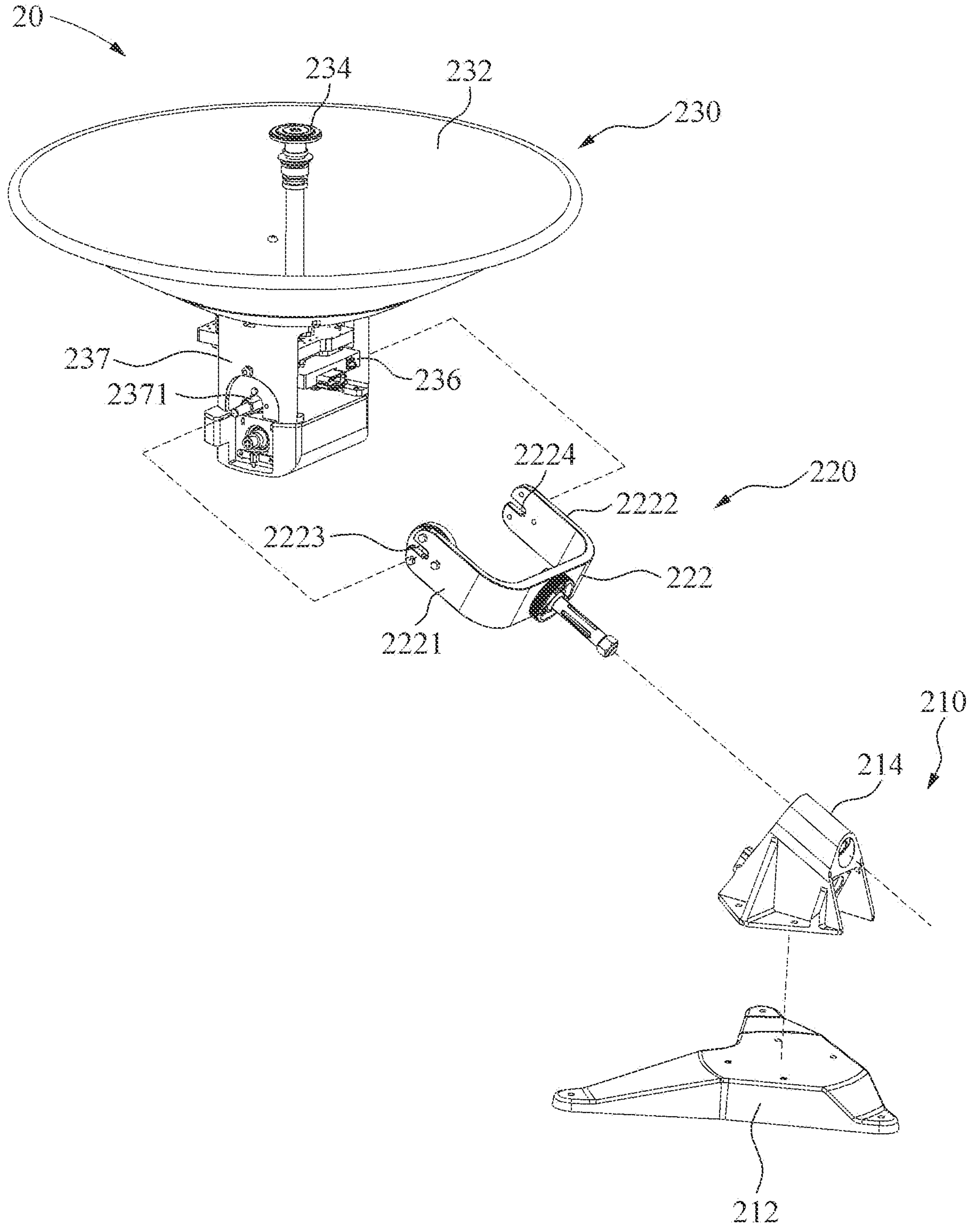
FIG. 10 is an exploded perspective view schematically illustrating the structure of the pedestal of FIG. 9.

FIG. 9 is a perspective view schematically illustrating a structure of a pedestal according to an example embodiment, and FIG. 10 is an exploded perspective view schematically illustrating the structure of the pedestal of FIG. 9.

Referring to FIGS. 9 and 10, a pedestal 20 according to an example embodiment may include a first supporter 210, a second supporter 220, and a tracker 230. In this example embodiment, the second supporter 220 is configured to have a tilted azimuth axis TAZ of about 65 degrees with respect to a reference plane on which the first supporter 210 is installed.

The first supporter 210 may include a spacer 212 including a plurality of feet extending radially, and a first frame 214 installed on the spacer 212, having a hole through which the second supporter 220 is rotatably coupled thereto, and configured to support the second supporter 220. The hole in the first frame 214 may be provided to be aligned with the tilted azimuth axis TAZ of the pedestal 20 and a drive shaft of a first driver (not shown).

The second supporter 220 may include a second frame 222, and the second frame 222 may include a first arm 2221 having a first slot 2223 and a second arm 2222 having a second slot 2224. The first arm 2221 and the second arm 2222 may have portions that extend substantially in parallel.

The tracker 230 may include a reflecting body 232, a feed horn 234, a transmitting/receiving device 236, and a third frame 237. The third frame 237 may have a housing shape to receiving the transmitting/receiving device 236. A first shaft 2371 may be provided on at least one side surface of the third frame 237 such that a second driver (not shown) may be coupled thereto through the first slot 2223.

As described above, considering the need to change the structure of a pedestal as a tilt angle formed by an azimuth axis with respect to a reference plane changes, a simpler one out of several structures of pedestals having a tilted azimuth axis with respect to a reference plane may be selected in many aspects (e.g., the aspect of structural rigidness, the aspect of driving efficiency of pedestal, and the like).

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

The invention claimed is:

1. A pedestal comprising:
- a first supporter defining an azimuth axis;
- a second supporter coupled to the first supporter and having a pivot; and
- a tracker coupled to the second supporter about the pivot and configured to track an object within a field of view,
- wherein the second supporter is rotatable about the azimuth axis wherein the azimuth axis is tilted at a tilt angle with respect to a reference plane on which the first supporter is installed, and wherein the first supporter has a fixed position with respect to the reference plane.

2. The pedestal of claim 1, wherein the tracker has an orientation axis, where the tilt angle is set such that a singularity point at which the orientation axis of the tracker coincides with the azimuth axis is present in a vicinity of the field of view or outside the field of view.

3. The pedestal of claim 1, wherein the tracker is configured to rotate independently with respect to each of the azimuth axis and the pivot.

4. The pedestal of claim 1, wherein the first supporter is installed on the reference plane and has an inclined surface that is inclined with respect to the reference plane, and the second supporter is installed on the inclined surface and wherein the azimuth axis extends along the second supporter and intersects an axis of the pivot.

5. The pedestal of claim 4, further comprising:
- a cable connecting the first supporter and the tracker, where space is provided between the first supporter and the tracker to sufficiently receive the cable so as to prevent interference between the cable and the tracker and a twist of the cable while the tracker rotates with respect to the pivot.

6. The pedestal of claim 5, wherein the cable is placed on a same side of the tracker and the first supporter.

7. The pedestal of claim 5, wherein the cable is prevented from wrapping while the tracker rotates with respect to the pivot.

8. The pedestal of claim 5, wherein the cable has a slack configuration while the tracker rotates with respect to the pivot in a first direction, and has a taut configuration while the tracker rotates with respect to the pivot in a second direction which is opposite to the first direction.

9. The pedestal of claim 1, wherein the tracker may rotate with respect to an elevational axis about the pivot, and with respect to the azimuth axis independently from any rotation of the tracker with respect to the elevational axis.

10. The pedestal of claim 1, further comprising a first driver mounted on the first supporter for rotating the second supporter about the azimuth axis.

11. The pedestal of claim 10, further comprising a second driver mounted on the second supporter for driving the tracker about the pivot.

12. The pedestal of claim 11, further comprising a first balancer mounted on the second supporter opposite the second driver.

* * * * *